United States Patent
Tseng et al.

(10) Patent No.: US 10,624,150 B2
(45) Date of Patent: Apr. 14, 2020

(54) RADIO RESOURCE CONTROL CONNECTION RESUME METHOD OF WIRELESS COMMUNICATION SYSTEM

(71) Applicants: Yung-Lan Tseng, Hsinchu (TW); Mei-Ju Shih, Hsinchu (TW); Chie-Ming Chou, Hsinchu (TW); Chia-Hung Wei, Hsinchu (TW)

(72) Inventors: Yung-Lan Tseng, Hsinchu (TW); Mei-Ju Shih, Hsinchu (TW); Chie-Ming Chou, Hsinchu (TW); Chia-Hung Wei, Hsinchu (TW)

(73) Assignee: FG Innovation Company Limited, Tuen Mun, New Territories (HK)

( * ) Notice: Subject to any disclaimer, the term of this patent is extended or adjusted under 35 U.S.C. 154(b) by 39 days.

(21) Appl. No.: 15/884,076

(22) Filed: Jan. 30, 2018

(65) Prior Publication Data

US 2018/0220486 A1 Aug. 2, 2018

Related U.S. Application Data

(60) Provisional application No. 62/451,937, filed on Jan. 30, 2017.

(51) Int. Cl.
| | | |
|---|---|---|
| *H04W 76/27* | (2018.01) | |
| *H04W 74/08* | (2009.01) | |
| *H04W 36/30* | (2009.01) | |
| *H04L 5/00* | (2006.01) | |
| *H04W 88/08* | (2009.01) | |
| *H04W 88/02* | (2009.01) | |
| *H04W 36/14* | (2009.01) | |
| *H04W 36/00* | (2009.01) | |

(52) U.S. Cl.
CPC ......... *H04W 76/27* (2018.02); *H04W 36/305* (2018.08); *H04W 74/0833* (2013.01); *H04L 5/0055* (2013.01); *H04W 36/0033* (2013.01); *H04W 36/14* (2013.01); *H04W 88/02* (2013.01); *H04W 88/08* (2013.01)

(58) Field of Classification Search
None
See application file for complete search history.

(56) References Cited

U.S. PATENT DOCUMENTS

| | | | | |
|---|---|---|---|---|
| 2004/0017796 | A1* | 1/2004 | Lemieux | H04L 45/04 370/349 |
| 2017/0202050 | A1* | 7/2017 | Deng | H04W 76/18 |
| 2017/0331670 | A1* | 11/2017 | Parkvall | H04W 52/0274 |
| 2018/0332462 | A1* | 11/2018 | Kim | H04W 8/02 |
| 2019/0021128 | A1* | 1/2019 | Sivavakeesar | H04W 4/70 |
| 2019/0021134 | A1* | 1/2019 | Zhang | H04W 76/27 |

\* cited by examiner

*Primary Examiner* — James P Duffy
(74) *Attorney, Agent, or Firm* — ScienBiziP, P.C.

(57) ABSTRACT

An RRC connection resume method of a wireless communication system is provided. An RRC suspend message is received by a UE from a first base station. An RRC resume procedure is performed by the UE with a second base station in response to the RRC suspend message. An RRC resume response is received by the UE from the second base station.

17 Claims, 8 Drawing Sheets

RADIO RESOURCE CONTROL CONNECTION RESUME METHOD OF WIRELESS COMMUNICATION SYSTEM

CROSS REFERENCE

This application claims the benefit of U.S. Provisional Application Ser. No. 62/451,937, filed on Jan. 30, 2017, and entitled "INTRA-RAT/INTER-RAT RRC RESUME PROCEDURES FOR MOBILITY ENHANCEMENT", which is incorporated herein by reference in its entirety.

TECHNICAL FIELD

The present disclosure generally relates to radio resource control (RRC) connection resume methods, and more particularly, to RRC resume procedures for a wireless communication system related to a Narrow-Band Internet of Things (NB-IoT).

BACKGROUND

The next generation new radio Narrow-Band Internet of Things (NR NB-IoT) is a new radio access technology of the next generation radio access network (RAN) that the $3^{rd}$ Generation Partnership Project (3GPP) is developing to support a large amount of low-cost device (e.g., $10^6$ devices/$Km^2$) to exchange (e.g., transmit and receive) data in the next generation radio access network (e.g., 5G-RAN). Based on the legacy NB-IoT, which is the NB-IoT specifications designed in 3GPP Release 13 and Release 14 specifications for Internet of Things, the NR NB-IoT is to integrate with the legacy NB-IoT to co-exist with other Radio Access Technologies (RATs) of the next generation RAN, such as the next generation wide band (e.g., 5G-WB) technology. As the next generation wide band (e.g., 5G-WB) RAT uses millimeter wave transmission and reception, which suffer from high path loss, the NR NB-IoT may be used to cover areas within the next generation radio access network (e.g., 5G-RAN) that are not covered by the 5G-WB. That is, the NR NB-IoT may supplement or cover the so-called "wide band holes" within the next generation radio access network (e.g., 5G-RAN). For example, since the next generation wide band (e.g., 5G-WB) cells are relative small (e.g., with a coverage radius of 100 meters), if a user equipment (UE) moves out of the next generation wide band cells and still keeps looking for the wide band cells, the UE may have to frequently conduct cell selection and reselection. The frequent cell selection and reselection are both power inefficient for the UE and a waste of the radio access resources of the wide band cells. Moreover, the NR NB-IoT is to co-exist with legacy Global System for Mobile Communications (GSM), General Packet Radio Service (GPRS), and Evolved Universal Terrestrial Radio Access (E-UTRA) networks. Thus, there is a need in the art for methods to handle NR NB-IoT related intra-RAT and inter-RAT procedures. In this disclosure, the intra-RAT and inter-RAT is differentiated based on 5G-RAT, which covers 5G-WB technology and NR NB-IoT technology. A UE switching between 5G-WB cell and NR NB-IoT cell is regarded as an intra-RAT procedure, while switching between a 5G-RAT with other RATs (e.g., E-UTRA) is regarded as an inter-RAT procedure.

In addition, since a NR NB-IoT cell may cover a relatively large area (e.g., with a coverage radius of several kilometers) as compared to a next generation wide band cell (e.g., a 5G-WB cell), the NR NB-IoT needs to provide different coverage enhancement (CE) levels/labels based on the signal strength seen by the UEs in the NR NB-IoT cell. For example, the CE levels/labels may indicate how many times the UE or its serving base station needs to repeat the transmission to mitigate the inefficiency of the control and/or data channel. For example, according to the 3GPP Release 13, in legacy NB-IoT, a UE needs to conduct a signal strength measurement by itself to estimate an appropriate CE level/label to decide on, among other things, the CE label's range, the associated UE resource for transmission, and how many times the UE needs to repeat the control and/or data signal. However, the CE level/label estimated by the UE may not be sufficiently accurate to ensure a successful transmission from the UE to the legacy NB-IoT. This is because the uplink channel condition as seen by the legacy NB-IoT base station may be worse than the downlink channel condition as seen by the UE, which is reflected in the CE level/label based on the UE's measurement. Thus, in light of introduction of the NR NB-IoT in the next generation radio access network (RAN), there is a need in the art for methods to provide accurate coverage enhancement levels/labels to handle NR NB-IoT related intra-RAT and inter-RAT procedures.

Furthermore, in a next generation radio access network (e.g., 5G-RAN), a UE may transition from an RRC connected state to an RRC inactive state or an RRC idle state, where the UE may take measurements to perform cell selection and cell reselection, even when the UE is in the RRC idle or RRC inactive state. For the RRC state transitions, an RRC suspend message and an RRC Resume message may be used. For example, in a next generation radio access network (e.g., 5G-RAN), the RRC Suspend message may inform a UE that the serving base station (e.g., a next generation node B (gNB)) will release the RRC connection, but will retain the UE context. When there is a need for packet exchange, the UE can quickly send a RRC Resume message, so that the UE and serving base station can resume an RRC connection for data/control signal transmission to reduce latency and radio access overhead.

Thus, in light of introduction of the NR NB-IoT in the next generation radio access network (RAN), there is a need in the art for methods to handle NR NB-IoT related intra-RAT and inter-RAT RRC resume procedures for mobility enhancement.

SUMMARY

In one aspect of the present disclosure, an RRC connection resume method of a wireless communication system is provided. An RRC suspend message is received by a UE from a first base station. An RRC resume procedure is performed by the UE with a second base station in response to the RRC suspend message. An RRC resume response is received by the UE from the second base station.

In another aspect of the present disclosure, a UE is provided. The UE includes a processor configured to perform the followings instructions. An RRC suspend message is received from a first base station. An RRC resume procedure is performed with a second base station in response to the RRC suspend message. An RRC resume response is received from the second base station.

In yet another aspect of the present disclosure, a base station is provided. The base station includes a processor configured to perform the followings instructions. An RRC suspend message is transmitted to the UE. A UE context fetch request is received from a second base station. A UE context fetch response is transmitted to the second base station in response to the UE context fetch request.

In yet another aspect of the present disclosure, a base station is provided. The base station includes a processor configured to perform the followings instructions. An RRC resume request is received from the UE. A UE context fetch request is transmitted to a first base station in response to the RRC resume request. A UE context fetch response is received from the first base station. An RRC resume response is transmitted to the UE in response to the UE context fetch response.

DETAILED DESCRIPTION

Figure 1:
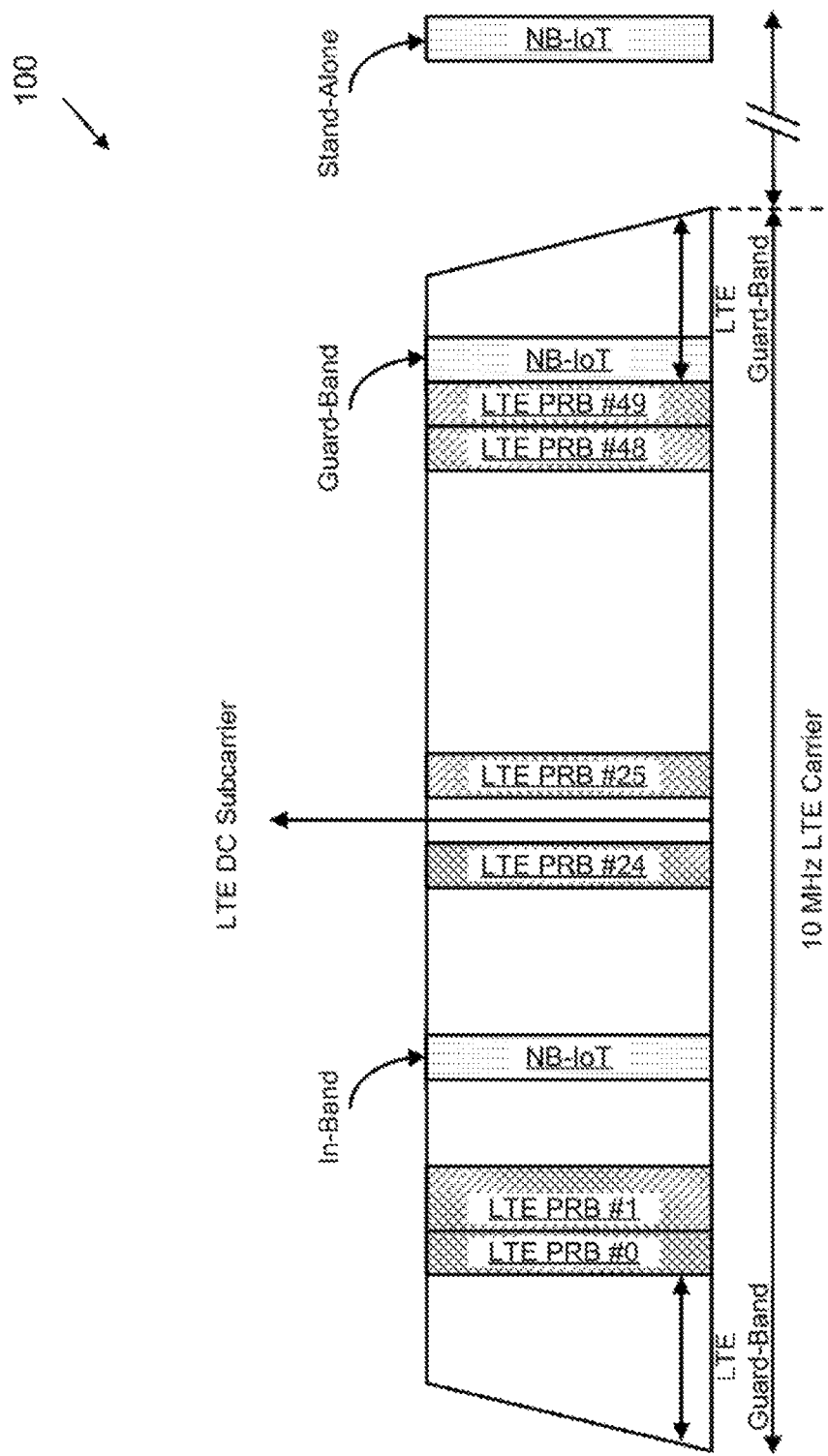
FIG. 1 is a diagram illustrating various legacy NB-IoT deployment options in a legacy long-term evolution (LTE) network.

The following description contains specific information pertaining to exemplary embodiments in the present disclosure. The drawings in the present disclosure and their accompanying detailed description are directed to merely exemplary embodiments. However, the present disclosure is not limited to merely these exemplary embodiments. Other variations and embodiments of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

FIG. 1 is a diagram illustrating various legacy NB-IoT deployment options in a legacy long-term evolution (LTE) network. In FIG. 1, the legacy NB-IoT may have three deployment options, namely, in-band deployment, guard-band deployment, and stand-alone deployment. In FIG. 1, the legacy NB-IoT may occupy 180 KHz (i.e., $180 \times 10^3$ Hertz) minimum system bandwidth for both downlink (DL) and uplink (UL) operations. The in-band deployment of the legacy NB-IoT may make use of the same resource block in a long-term evolution (LTE) carrier, such as a 10 MHz (i.e., $10 \times 10^6$ Hertz) LTE carrier, of a legacy LTE network. The guard-band deployment of the legacy NB-IoT may be done using the guard-band of the existing LTE network. The stand-alone deployment of the legacy NB-IoT may use a bandwidth outside of the LTE carrier bandwidth of the existing LTE network.

According to an exemplary implementation of the present implementation, the NR NB-IoT may have the same deployment options as the legacy NB-IoT. In addition, the NR NB-IoT can be integrated into the next generation wireless communication networks, such as a next generation radio access network (e.g., 5G-RAN). For example, the NR NB-IoT deployment in FIG. 1 may be applied to the next generation radio access network (e.g., 5G-RAN) by replacing the LTE cell with a next generation wide-band (e.g., 5G-WB) cell. It is noted that "wide-band" is to used here to differentiate the next generation new radio cell (e.g., a 5G-NR cell) from a NR NB-IoT cell, which operates on, for example, 180 KHz bandwidth. The next generation wide-band cell may have carrier frequencies ranging from 6 GHz to more than 60 GHz, with wide bandwidth ranging from millimeter-wave to micro-wave bands. However, it is also worthy to note that NR wide-band operation under 6 GHz is not excluded. In the next generation radio access network (e.g., a 5G-RAN), a base station, such as a next generation node B (gNB), may provide both the next generation wide-band (e.g., 5G-WB) cell(s) and NR NB-IoT cell(s). Different NR NB-IoT cell(s) and 5G-WB cell(s) within a gNB may be regarded as different cells. The gNB can control UEs to switch to a NR NB-IoT cell or a 5G-WB cell, both belong to a next generation radio access network (e.g., 5G-RAN). In some embodiments, a NR NB-IoT cell may share one physical cell ID with at least one 5G-WB cell. Under this condition, the NR NB-IoT cell is treated as one physical layer configuration in the 5G-RAN.

A NR NB-IoT cell may provide a large service coverage for a number of UEs. A UE may connect to the NR NB-IoT cell based on a coverage enhancement level (CE level) configuration to improve radio resource allocation efficiency. In one implementation, a NR NB-IoT cell may configure multiple CE levels, each CE level having an individual radio resource configuration. For example, the radio resource configuration may cover the following resource domains:

(1) Time domain: periodicity of radio resource.
(2) Frequency domain: frequency location (in terms of subcarrier offset), and number of subcarriers.
(3) Code domain: Preamble (group) configuration for random access.
(4) Number of repetitions in packets transmission when the UE is transmitting/receiving data and control signaling with the NR NB-IoT cell.
(5) Resource allocations for UE to exchange data/control signaling with the NR NB-IoT cell. Also note the resource may be configured as periodic or aperiodic in time domain.

A UE in the NR NB-IoT cell may take the UE's downlink (DL) measurements of the NR NB-IoT cell to obtain received signal strength (e.g., Reference Signal Received Power (RSRP), Reference Signal Received Quality (RSRQ), Received Signal Strength Indicator (RSSI), or SINR (Signal to Interference plus Noise Ratio)) to decide the CE level based on the DL measurement result. The UE may then select the radio resource and random access preamble transmission power based on the estimated CE level for the random access process. It is worthy to note that a random access failure may occur to the UE. After the random access failure happens for several times, the UE may reselect another CE level and undergo the random access process again to redo random access with the gNB.

In the next generation radio access network (e.g., 5G-RAN), a next generation base station (e.g., a gNB) may suspend RRC connection and radio bearers (e.g., Signal Radio Bearer, Data Radio Bearer) of a UE by using an RRC suspend procedure. To suspend the RRC connection, the serving base station (e.g., a gNB) of the UE may send an RRC connection release message with resume identity to the UE. Then, the UE may store the UE's context, which include AS context and security context, and then suspend the RRC connection after receiving the RRC connection release message. The serving base station (e.g., a gNB) may also store the UE's context when the UE's RRC connection is suspended.

After the RRC connection is suspended, the UE may request to resume the suspended RRC connection by sending RRC connection resume request with the given resume identity to a target base station, which may be the original serving base station sending the RRC suspend message to the UE (e.g., a gNB or an eNB), or a different base station in the RAN (e.g., a gNB or an eNB). In response to the request to resume the RRC connection, the target base station may (1) resume the suspended RRC connection of the UE; or (2) reject the request to resume and instruct the UE to either keep or modify (part of) the stored context; or (3) setup a new RRC connection for the UE. It is also worthy to note the target base station (e.g., a gNB or an eNB) and the serving base station (e.g., a gNB) may be different base stations. So, the target base station may require UE's context from the serving base station through a process called UE context fetch.

Figure 2:
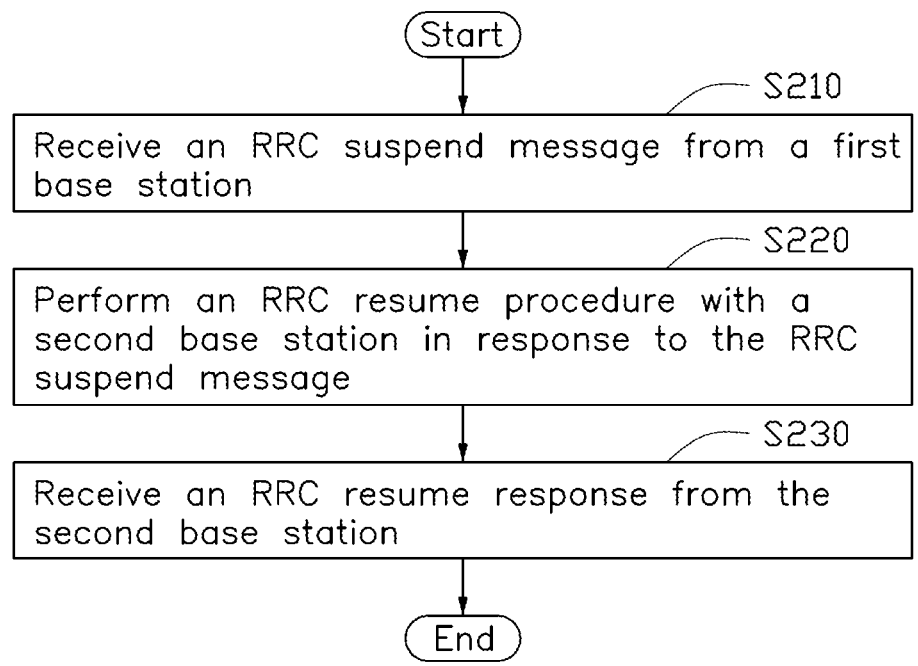
FIG. 2 is a flowchart of an RRC connection resume method of a wireless communication system, according to an exemplary embodiment of the present disclosure.

FIG. 2 is a flowchart of an RRC connection resume method of a wireless communication system, according to an exemplary embodiment of the present disclosure. In step S210, an RRC suspend message is received by a UE from a first base station. In step S220, an RRC resume procedure is performed by the UE with a second base station in response to the RRC suspend message. In step S230, an RRC resume response is received by the UE from the second base station.

In one embodiment, the first base station and the second base station is realized by different radio access numerologies (e.g., sub-carrier spacing, cyclic pre-fix length, DL/UL configuration, frame structure), where one of the base stations is wide-band numerology and another one is narrow-band-Internet-of-Things numerology. In another embodiment, the first base station and the second base station is realized by different radio access technologies, where one of the base stations is narrow-band-Internet-of-Things numerology.

In one embodiment, the RRC suspend message includes an RRC resume UE ID delivered by the source cell to the UE. In some embodiments, the RRC resume UE ID includes a source cell ID (or truncated source cell ID).

In one embodiment, the RRC suspend message includes an RRC suspend type. For example, the RRC suspend type may include an inter-RAT mobility or an intra-RAT mobility. The source cell may indicate the RRC suspend type in the RRC resume message for the UE. Thus, the UE could know how to decode the RRC suspend message correctly by obtaining the RRC suspend type.

In one embodiment, the RRC suspend message includes target radio access technology (RAT) information, e.g. a target PLMN (public land mobile network) ID. For example, the source cell may indicate the target RAT for inter-RAT mobility support when the RRC suspend type is the inter-RAT mobility so that the UE could select the target cell. In one embodiment, the target radio access technology information includes a bandwidth part configuration, such as a bandwidth configuration in frequency domain, numerology information, or coverage enhancement level information. For example, the coverage enhancement level information is an authorized CE level(s) the UE is authorized to apply with a legacy NB-IoT (or a NR NB-IoT cell). The authorized CE level(s) of the UE is provided by the upper layers of RAN. In another embodiment, the coverage enhancement level information is a suggested CE level of the target legacy NB-IoT cell (or a NR NB-IoT cell) suggested by the source cell for UE. The source cell may decide the suggested CE level based on UE's measurement reports to the source cell. In some embodiments, the source cell may also measure the channel qualities (e.g., RSRP, RSRQ, RSSI, SINR) of UE's uplink data or control channels to decide the suggested CE level for UE. The coverage enhancement level information includes resource configuration in time/frequency/code domains and number of repetitions for DL/UL packet transmissions.

In one embodiment, the RRC suspend message includes target cell information. For example, the target cell information may include support information to help the UE to find out at least one target cell, such as a target cell ID, e.g., a physical cell ID of the target cell(s), which may be broadcasted by the target cell periodically. The support information may include a frequency band deployment (e.g., In-band/guard-band/standalone deployment) of the NB-IoT target cell (legacy NB-IoT cell or a NR NB-IoT cell). The support information may include a frequency carrier deployment, e.g., ARFCN (absolute radio-frequency channel number), EARFCN (E-UTRA absolute radio-frequency channel number), PRB (Physical resource block) index. The support information may include an operating bandwidth, e.g., 180 KHz for a legacy NB-IoT cell or a NR NB-IoT cell.

In one embodiment, the RRC suspend message includes an area information. For example, the area information includes tracking area information or a radio access network (RAN)-based notification area (RNA) configuration. The tracking area information (TAI) may include at least one physical cell ID or at least one tracking area ID for UE to perform core network-based tracking area update procedures. The TAI would be represented by at least one physical cell ID or at least one tracking area ID. The RNA configuration may include at least one physical cell ID or at least one RNA ID for UE to perform RNA update procedures.

In one embodiment, the RRC suspend message includes an RRC resume validity timer. The RRC resume validity timer may be utilized to invalidate UE context for UE side. UE may remove at least a part of UE context when the RRC resume validity timer expires.

In one embodiment, the RRC suspend message may include a definition of UL small packet transmission. For example, the definition of small packet (e.g. upper bound of the size of small packet) may be configured. Then, UE may deliver small packet transmission with the RRC resume request if the size of pending packet in the UE's buffer is smaller than the pre-defined value defined in the RRC suspend message. In some other embodiments, the definition of UL small packet transmission may be provided through broadcast message from the serving base station or target base station. When the definition of UL small packet is broadcasted by the target base station, UE would apply the definition of UL small packet broadcasted by the target base station. In some other embodiments, UE would apply the UL small packet definition broadcasted by the source base station. Also note that the UL small packet definition obtained by the RRC suspend message would have higher priority. Therefore, UE would not apply the UL small packet definition broadcasted by the source base station or target base station if the UE has a valid UL small packet definition configured by RRC suspend message.

In one embodiment, the RRC resume response indicates that whether the RRC resume procedure is performed successfully or not. In some embodiments, the RRC resume response further includes data packet acknowledgement (ACK) or Non-acknowledgement (NACK). For example, when the small uplink packet is transmitted with the RRC resume procedure, the second base station may transmit an ACK to the UE after the small uplink packet is received successfully, or transmit a NACK to the UE if the small uplink packet is not received.

In some embodiments, the RRC resume response further includes an area update response, when the RRC resume procedure includes an area update request (e.g., an RNA update or a CN-based tracking area).

Figure 3:
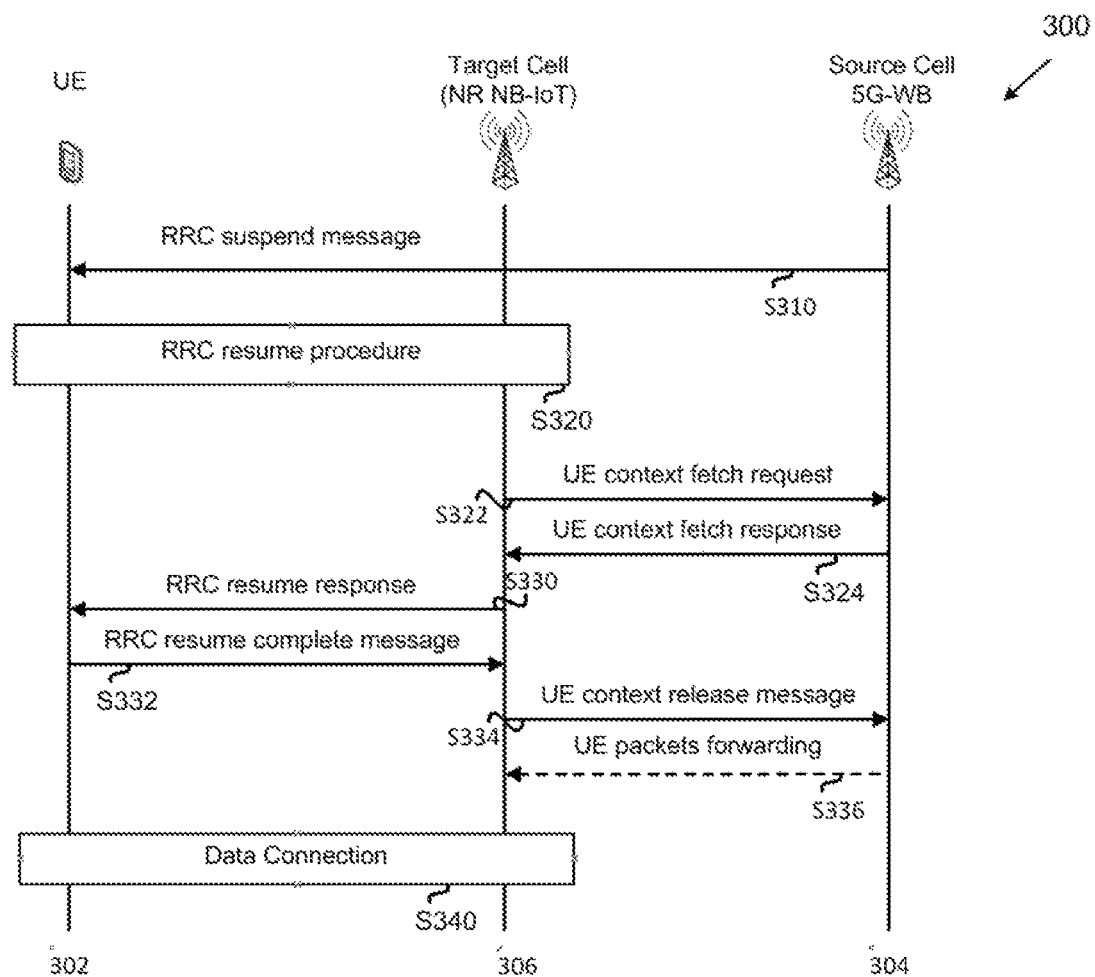
FIG. 3 is a diagram illustrating an intra-RAT RRC resume procedure of a wireless communication system for packet transmission and/or reception, according to an exemplary implementation of the present application.

FIG. 3 is a diagram illustrating an intra-RAT RRC resume procedure of a wireless communication system 300 for packet transmission and/or reception according to an exemplary implementation of the present application. The wireless communication system 300 includes UE 302, source cell 304 (serving base station), and target cell 306 (target base station). An intra-RAT RRC resume procedure enables a UE to switch from a source cell to a target cell both in a next generation radio access network (e.g., 5G-RAN). For example, the UE may switch from a source cell (e.g., a next generation wide-band cell, such as a 5G-WB cell) to a target cell (e.g., a NR NB-IoT cell).

In this embodiment, source cell 304 is a next generation wide band cell, while target cell 306 is a NR NB-IoT cell, where source cell 304 and target cell 306 are implemented under the same radio access technology but under different numerologies. In some embodiments, both the source cell and the target cell are 5G-WB cells or NR NB-IoT cells. In some embodiments, the source cell is a NR NB-IoT cell and the target cell is a 5G-WB cell.

In step S310, UE 302 may receive an RRC suspend message from source cell 304 (e.g., a 5G-WB cell), for example, when UE 302 or source cell 304 determines that the radio link quality between them is getting poor and/or satisfies one or more predefined conditions. For example, one predefined condition may be a reference signal measurement result(s) being lower than a threshold value(s). In this case, the RRC suspend message may include an RRC resume UE ID. Source cell 304 may configure UE 302 to transition from RRC connected state to RRC inactive state (or RRC idle state). In addition, source cell 304 may provide supporting information (e.g., target RAT information, or target cell information) in the RRC suspend message to help UE 302 find a target cell. In some implementations, source cell 304 may provide the supporting information based on UE 302's measurement report about the signaling qualities (e.g., RSRP, RSRQ, RSSI, SINR) which UE 302 has measured from neighbor cell(s). Under this condition, source cell 304 may require UE 302 to send its measurement report before source cell 304 provides the supporting information.

In step S320, UE 302 may find target cell 306 (e.g., a NR NB-IoT cell), and implement RRC resume procedure with target cell 306. UE 302 may include the RRC resume UE ID in the RRC resume procedure to target cell 306.

In step S322, after receiving the RRC resume procedure from UE in step S320, target cell 306 may attempt to obtain the UE context of UE 302 from source cell 304 by sending a UE context fetch request to source cell 304. There are several approaches for target cell 306 to identify source cell 304. In one approach, target cell 306 may identify source cell 304 by using the source cell ID included in the RRC resume UE ID. In another approach, for target cell 306 to identify source cell 304, UE 302 may add the source cell ID, which is broadcasted by source cell 304 (e.g. in the system information of source cell 304), in the RRC resume procedure. In step S324, source cell 304 may send a UE context fetch response to target cell 306. The UE context fetch response may include the UE context of UE 302.

In step S330, target cell 306 may send an RRC resume response to UE 302 when target cell 306 obtains the UE context of UE 302 from source cell 304. In this case, the RRC resume response is a success message when the UE context of UE 302 is successfully obtained from source cell 304 by target cell 306.

In step S332, UE 302 may send an RRC resume complete message to target cell 306. In step S334, after receiving the RRC resume complete message from UE 302, target cell 306 may send a UE context release message to source cell 304 to let source cell 304 release or remove the UE context of UE 302. In step S336, source cell 304 may optionally forward the UE packets of UE 302, which are buffered in the source cell 304, to target cell 306.

After the RRC resume complete message, UE 302 may transition from RRC inactive state (or RRC idle state) to RRC connected state, which is based on the instruction of the target cell 306 in the RRC resume response message S330. In step S340, UE 302 may establish a data connection for packet transmission and/or reception with target cell 306. Thus, UE 302 may continue data exchange even when it enters the wide band holes of 5G-WB cells.

It should be noted that, in some embodiments, target cell 306 may require UE 302 to rebuild a new RRC connection by sending RRC resume response (new RRC connection) to UE 302. Then, UE 302 may clear the stored UE context and then start RRC connection establishment process with target cell 306.

It should also be noted that, in some other embodiments, target cell 306 may reject the RRC resume procedure by sending RRC resume response with a rejection message to UE 202, for example, when target cell 306 could not obtain the UE context from source cell 304. When UE 302 is rejected by target cell 306, UE 302 may remove target cell 306 from the suitable cell(s) and find another cell for RRC resume procedure.

It is also worthy to note that, in some implementations, target cell 306 may not have direct backhaul connection with source cell 304. In such case, target cell 306 may deliver UE context fetch request to a core network (not explicitly shown in FIG. 3). The core network may contact with source cell 304 for UE context fetch request and then forward the UE context to target cell 306.

In one embodiment, after receiving the RRC suspend message, UE 302 may start packet reception if UE 302 receives paging message from the next generation radio access network (e.g., 5G-RAN). Then, UE 302 may also start the random access procedure and the following RRC resume procedure.

The RRC resume procedure may include a 2-step radio access procedure as described with reference to FIG. 4, or 4-step radio access procedure as described with reference to FIG. 5.

Figure 4:
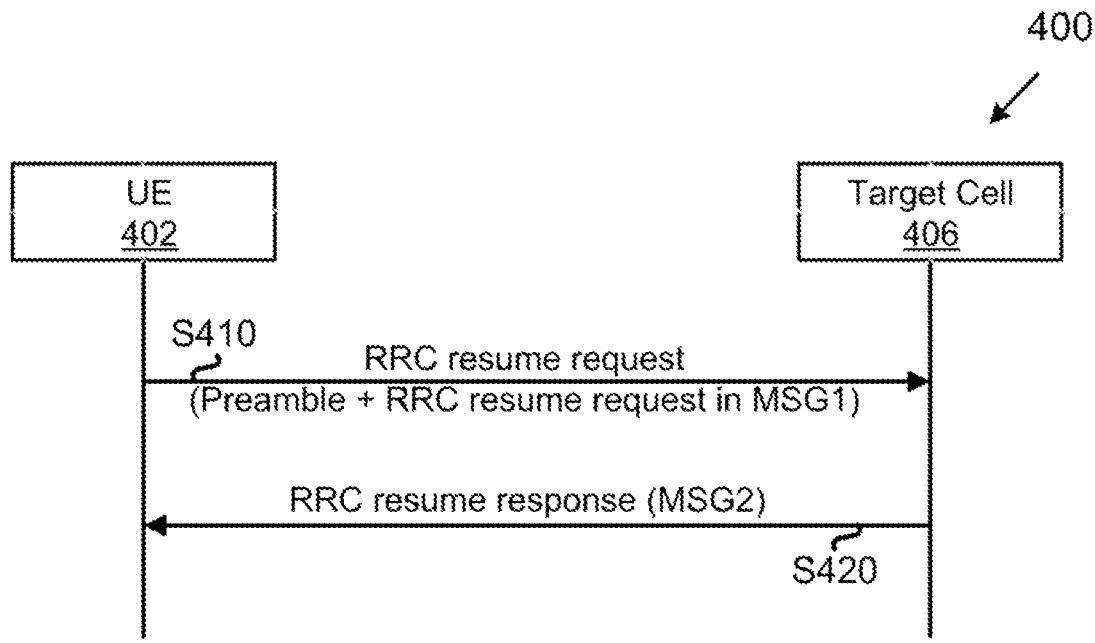
FIG. 4 is a diagram illustrating an RRC resume procedure achieved by a 2-step radio access procedure, according to an exemplary implementation of the present application.

FIG. 4 is a diagram illustrating an RRC resume procedure achieved by a 2-step radio access procedure, according to an exemplary implementation of the present application. The wireless communication system 400 includes UE 402 and target cell 406.

In step S410, UE 402 may multiplex a preamble sequence in MSG 1 with an RRC resume request in MSG 1, where the preamble may be given by RAN in the RRC suspend message or be given by UE autonomous selection from a pre-defined preamble group. Target cell 406 may receive the RRC resume request in the MSG1 of random access procedure. In some embodiments, for UL small packet transmission, the small data may be multiplexed with the preamble and the RRC resume request in the MSG 1. In step S420, target cell 406 may deliver an RRC resume response to UE 402 in the MSG2 of random access procedure. For UL small packet transmission, target cell 406 may provide an acknowledgement (ACK)/non-acknowledgement (NACK) message in the MSG2 to indicate whether target cell 406 has received the small packet in MSG1 successfully.

Figure 5:
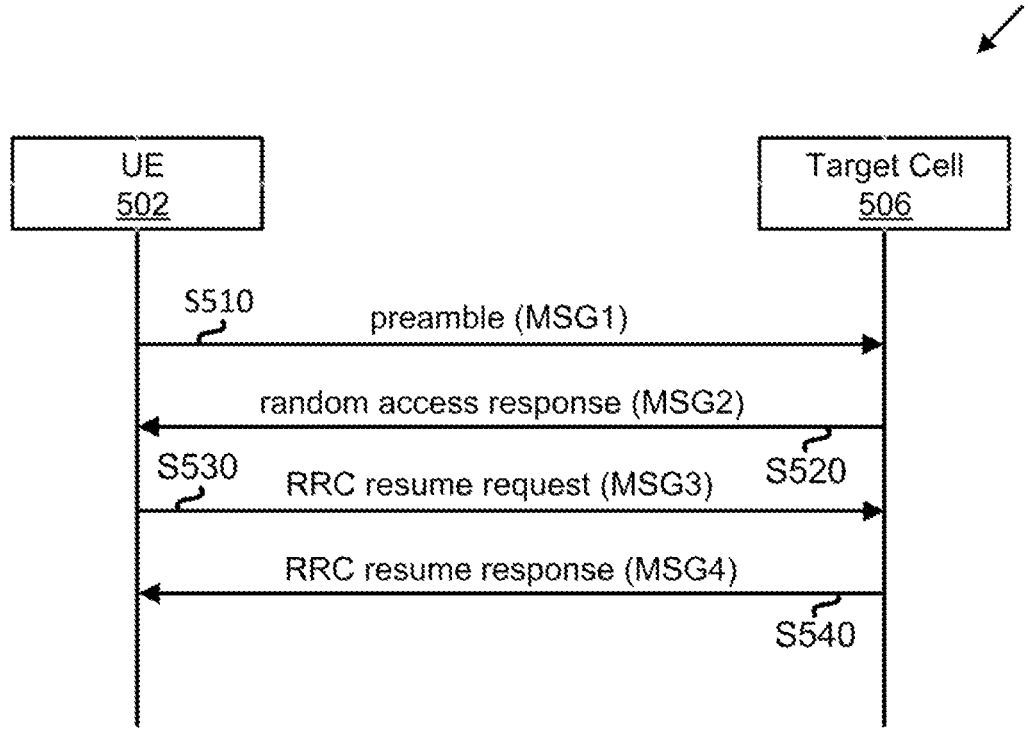
FIG. 5 is a diagram illustrating an RRC resume procedure achieved by a 4-step radio access procedure, according to an exemplary implementation of the present application.

FIG. 5 is a diagram illustrating a RRC resume procedure achieved by a 4-step radio access procedure, according to an exemplary implementation of the present application. The wireless communication system 500 includes UE 502 and target cell 506.

In step S510, UE 502 may send a preamble (e.g., a random access preamble) to target cell 506 through MSG1. In step S520, target cell 506 may send a random access response in MSG2, if target cell 506 decodes MSG1 successfully. Target cell 506 may configure radio resource in MSG2 for UE 502 to deliver MSG3. In step S530, UE 502 may deliver an RRC resume request in MSG3 to target cell 506. In some embodiments, for UL small packet transmission, the small data may be multiplexed with the RRC resume request in MSG 3. In step S540, target cell 506 may deliver an RRC resume response through MSG4 to UE 502. For UL small packet transmission, target cell 506 may provide an ACK/NACK message in the MSG4 to indicate whether target cell 506 has received the small packet in MSG3 successfully.

It should be noted that each of the 2-step and 4-step random access procedures may be applied to both the intra-RAT RRC resume and inter-RAT RRC resume procedures.

Figure 6:
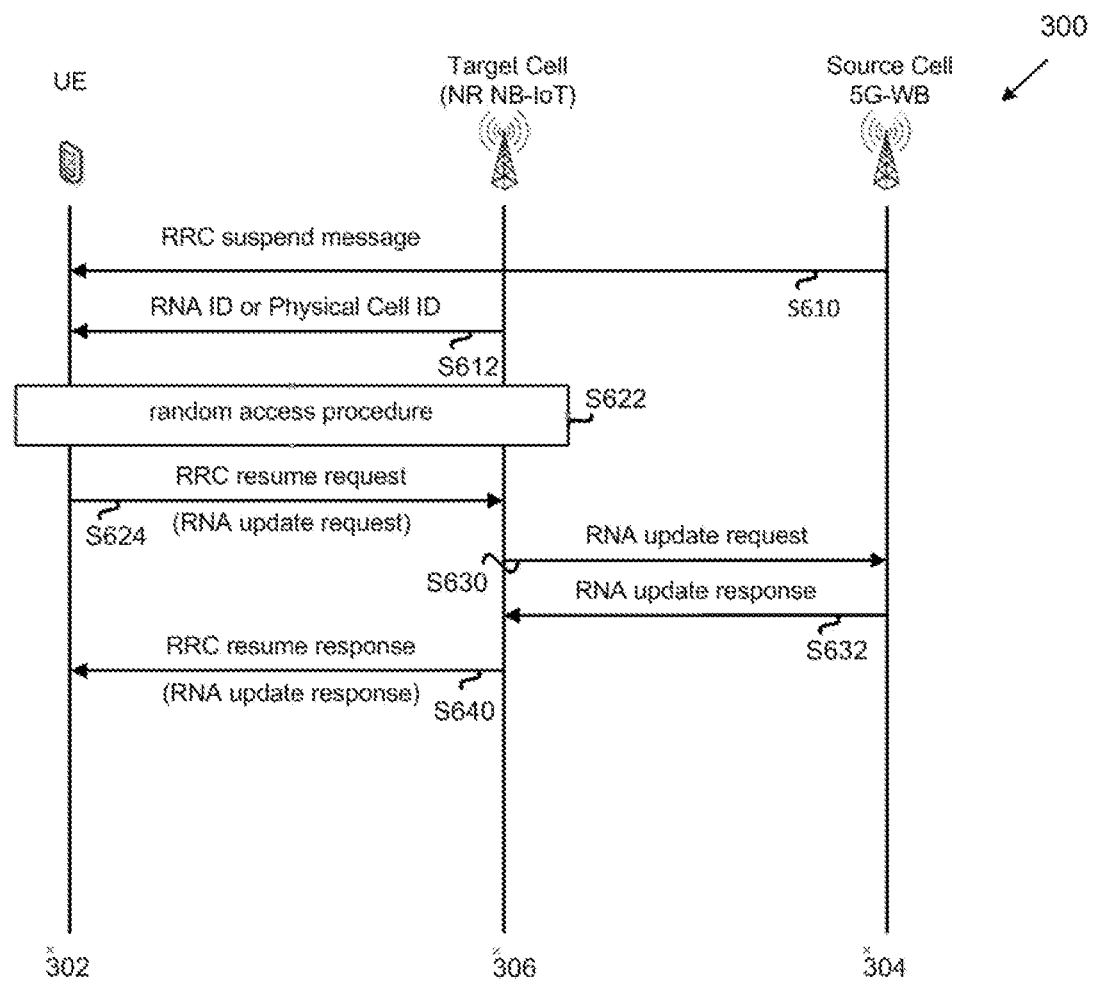
FIG. 6 is a diagram illustrating an intra-RAT RRC resume procedure for radio access network (RAN)-based notification area (RNA) update, according to an exemplary implementation of the present application.

FIG. 6 is a diagram illustrating an intra-RAT RRC resume procedure for RAN-based notification area (RNA) update, according to an exemplary implementation of the present application. In this embodiment, UE may send an RRC resume request to a target cell for a RAN-based notification area (RNA) update.

In step S610, UE 302 may receive an RRC suspend message from source cell 304 (e.g., a 5G-WB cell). In this embodiment, the RRC suspend message includes an RNA configuration for RNA update. The RNA configuration may include at least one RNA ID or at least one physical cell ID.

In step S612, neighboring cells of source cell 304, such as target cell 306, may broadcast physical cell ID or RNA ID. After checking the received physical cell ID or RNA ID with the stored RNA configuration, UE 302 may trigger RNA update. For example, UE 302 may trigger RNA update if the received physical cell ID/RNA ID is not found in the stored RNA configuration. In some embodiments, the RNA update is triggered periodically based on a given RNA update timer, which may be provided in the RRC suspend message. When UE 302 is configured with an RNA update timer, UE 302 would start counting the RNA update timer during RRC inactive state (or RRC idle state). UE would trigger RNA update progress (i.e., S622, S624, and S640) with RAN after the RNA update timer expires. Then, UE would reset the RNA update timer again after the RNA update with RAN succeeds. The RNA update timer may be released after UE 302 transitions to other RRC states.

In step S622, UE 302 may establish connection with target cell 306 by using random access procedure. In step S624, UE 302 may trigger RNA update by sending an RNA update request within the RRC resume request. Target cell 306 may identify source cell 304 of UE 302 after receiving the RNA update request. Then, in step S630, target cell 306 may deliver the RNA update request, which includes the physical cell ID of the target NR NB-IoT cell, to source cell 304. After receiving the RNA update request from target cell 306, source cell 304 may update the RNA record of UE 302 in UE 302's context.

In step S632, source cell 304 may send an RNA update response to target cell 306. Moreover, the target cell 306 and/or source cell 304's RAN may provide new RNA configuration to UE 302 in the RNA update response. In step S640, target cell 306 may deliver an RNA resume response to UE 302. UE 302 may replace the stored RNA configuration with the new RNA configuration. It is worthy to note that, UE 302 does not undergo RRC state transition during the RNA update procedure. In other words, UE 302 stays in RRC inactive state or RRC idle state during the RNA update.

Figure 7:
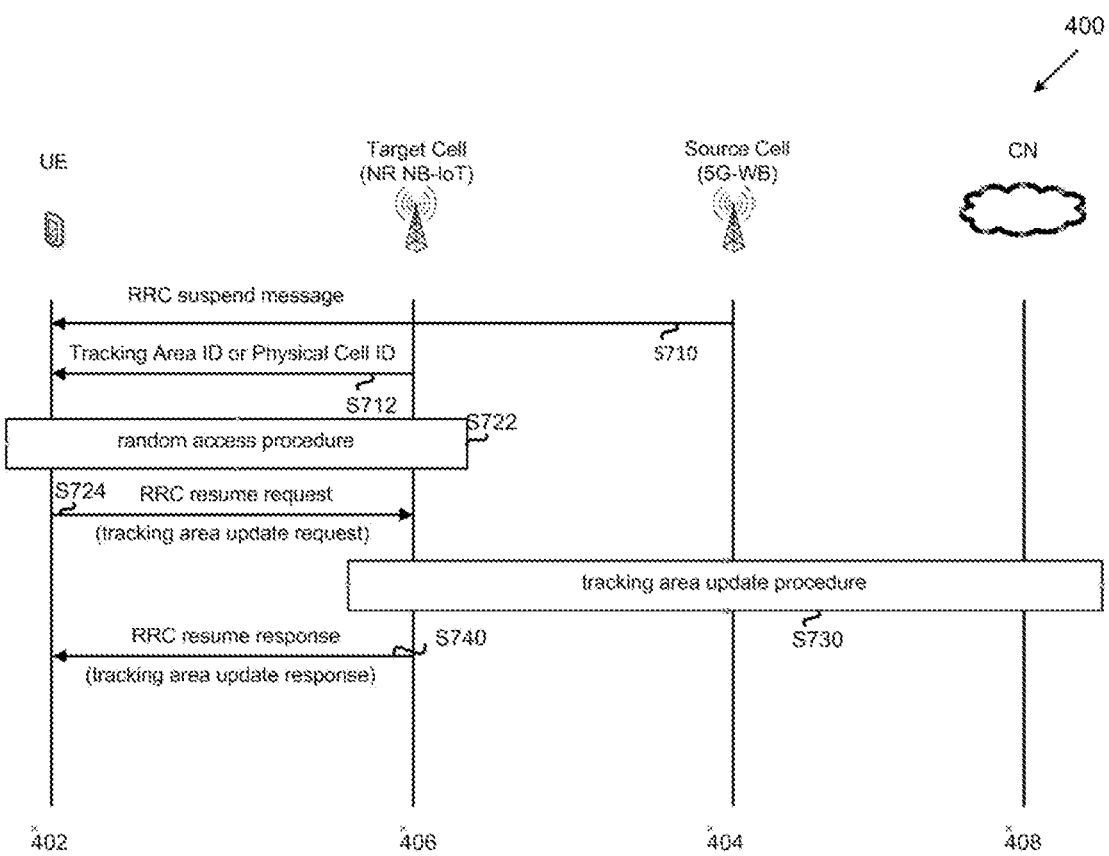
FIG. 7 is a diagram illustrating an intra-RAT RRC resume procedure for core network (CN)-based tracking area update, according to an exemplary implementation of the present application.

FIG. 7 is a diagram illustrating an intra-RAT RRC resume procedure for core network (CN)-based tracking area update, according to an exemplary implementation of the present application. The wireless communication system 400 includes UE 402, source cell 404, target cell 406, and CN 408. In this embodiment, source cell 404 is a next generation wide band cell, while target cell 406 is a NR NB-IoT cell, where source cell 404 and target cell 406 are implemented under the same radio access technology.

In step S710, UE 402 may receive an RRC suspend message from source cell 404 (e.g., a 5G-WB cell). For example, source cell 404 may send the RRC suspend message, when UE 402 or source cell 404 determines that the radio link quality between them is getting poor and/or satisfies one or more predefined conditions. In this embodiment, the RRC suspend message includes tracking area information for CN-based tracking area update. The tracking area information may include at least one physical cell ID or at least one tracking area ID.

In step S712, target cell 406 may broadcast physical cell ID or tracking area ID. UE 402 may decide to trigger CN-based tracking area update by checking physical cell ID or tracking area ID received from target cell 406 and the stored tracking area information. For example, UE 402 may trigger CN-based tracking area update if the received physical cell ID or tracking area ID is not found in the stored tracking area information. In some other embodiments, the CN-based tracking area update is triggered periodically based on a given TA update timer, which may be provided in the RRC suspend message. When UE402 is configured with a TA update timer, UE402 would start counting the TA update timer during RRC idle state (or RRC inactive state). UE would trigger TA update progress (i.e., S722, S724, and S740) with network after counting TA update timer expires. Then, UE would reset the TA update timer after the TA update with network succeeds. The TA update timer may be released after UE 402 transitions to other RRC states.

In step S722, UE 402 may establish connection with target cell 406 by using random access procedure. In step S724, UE 402 may send a tracking area update request within the RRC resume request to target cell 406. In step S730, a tracking area update procedure is performed. In step S730, target cell 406 may forward the tracking area update request to source cell 404. Then, source cell 404, CN 408, or target cell 406 may cooperate to achieve tracking area update procedure for UE 402. UE 402's UE context (and thus the RRC connection) may be switched to target cell 406 after the tracking area update procedure. In step S740, target cell 406 may deliver RRC resume response, which contains a tracking area update response, to UE 402 after the tracking area update procedure is performed successfully. The RRC resume response may include new tracking area information. Thus, UE 402 may replace the stored tracking area information with the new tracking area information.

In one embodiment, the RRC resume request includes an RRC resume request cause. For example, the RRC resume request cause may be a UL packet transmission, a DL packet reception (after the UE receives paging message from RAN), a UL small packet transmission, an RNA update, or a CN-based tracking area update. It is noted that the UL small packet transmission may be a special case of UL packet transmission, which happens to an RRC inactive UE. RRC inactive UE may deliver a small packet without transitioning to RRC connected state (or temporary transitioning to RRC connected state) and it might influence the behaviors of the UE and RAN in the random access procedure. The definition of small packet (e.g. upper bound of the size of small packet) may be pre-configured to the UE (e.g., through broadcast message) or be configured with the RRC suspend message.

In one embodiment, the RRC resume request includes source cell information. For example, the source cell information may include either: 1) a source RAT (e.g., NR NB-IoT, E-UTRA); or 2) a source PLMN ID, which is obtained from the broadcasting message (e.g., system information) of the source cell; or 3) a source cell ID.

Inter-RAT RRC resume procedure enables a UE to switch from a source cell to a target cell, where the source cell and target cell are implemented using different radio access technologies.

Figure 8:
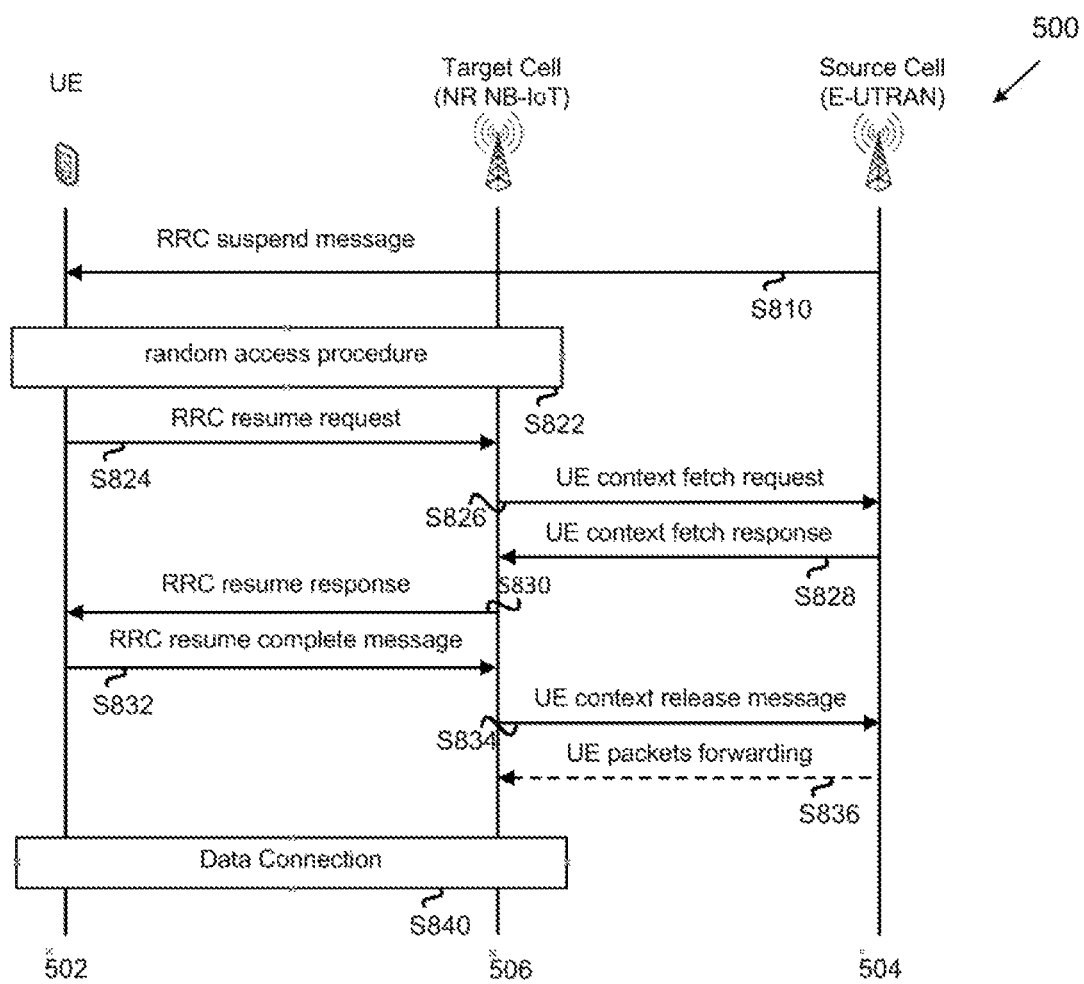
FIG. 8 is a diagram illustrating an inter-RAT RRC resume procedure for packet transmission and/or reception, according to an exemplary implementation of the present application.

FIG. 8 is a diagram illustrating an inter-RAT RRC resume procedure for packet transmission/reception, according to an exemplary implementation of the present application. The wireless communication system 500 includes UE 502, source cell 504, and target cell 506. In this embodiment, source cell 504 is an E-UTRAN (Evolved Universal Terrestrial Radio Access Network) cell, while target cell 506 is a NR NB-IoT cell, where source cell 504 and target cell 506 are implemented using different radio access technologies. In some embodiments, the source cell is a legacy NB-IoT cell and the target cell is a NR NB-IoT cell of 5G-RAN or vice versa. The source cell is an E-UTRAN cell and the target cell is a 5G-WB cell or vice versa. In some embodiments, the source cell is a legacy NB-IoT cell and the target cell is a 5G-WB cell of 5G-RAN or vice versa. In some embodiments, the source cell is an E-UTRAN cell and the target cell is a NR NB-IoT cell of 5G-RAN.

In step S810, UE 502 may receive RRC suspend message from source cell 504 (e.g., E-UTRAN cell) to indicate UE 502 to implement inter-RAT RRC resume procedure. Source cell 504 may create and include an RRC resume UE ID in the RRC suspend message to UE 502. UE 502 may transition from RRC connected state to RRC idle state (or RRC inactive state) after receiving the RRC suspend message.

In step S822, UE 502 may attempt to find target cell 506, and perform random access procedure with target cell 506 (e.g., a NR NB-IoT cell). In the inter-RAT RRC resume procedure, the RRC suspend message may include the target RAT (e.g. NR NB-IoT), and/or target cell information. In some embodiments, source cell 504 may provide the target RAT and/or target cell information based on UE 502's measurement report about the signaling qualities (e.g. RSRP, RSRQ, RSSI, SINR) UE 502 has measured from one or more neighbor cells.

After successfully finding target cell 506, in step S824, UE 502 may send the RRC resume request to target cell 506. The RRC resume request may include the RRC resume UE ID. After receiving the RRC resume request from UE 502, in step S826, target cell 506 may attempt to obtain the UE context of UE 502 by sending UE context fetch request to source cell 504. There are several approaches for target cell 506 to identify source cell 504. In one embodiment, target cell 506 may identify source cell 504 by using the source cell ID included in the RRC resume UE ID. In another embodiment, UE 502 may add the source RAT (e.g. E-UTRA) and/or the source cell ID, which is broadcasted by source cell 504 (e.g. in the system information of source cell 504), in the RRC resume request. In some embodiments, target cell 506 may not have direct backhaul connection with source cell 504. In such case, target cell 506 may deliver UE context fetch request to a core network (not explicitly shown in FIG. 8). Then, the core network may help target cell 506 obtain the UE context of UE 502 by sending a UE context fetch request to source cell 504.

In step S828, source cell 504 may send a UE context fetch response to target cell 506. The UE context fetch response may include the UE context of UE 502.

In step S830, target cell 506 may send RRC resume response to UE 502 indicating the UE context of UE 502 is successfully obtained from source cell 504. In step S832, UE 502 may send an RRC resume complete message to target cell 506. In step S834, after receiving the RRC resume complete message from UE 502, target cell 506 may send a UE context release message to source cell 504 to let source cell 504 release or remove the UE context of UE 502. In step S836, source cell 504 may optionally forward the pending DL packets of UE 502 to target cell 506.

After the RRC resume complete message, UE 502 may transition to RRC connected state from RRC inactive state (or RRC idle state), so that UE 502 can establish a data connection with target cell 506 directly for packet transmission and/or reception in step S840.

It should be noted that target cell 506 may require UE 502 to rebuild a new RRC connection by sending RRC resume response (new RRC connection) to UE 502. Then, UE 502 may clear the stored UE context and start RRC connection establishment process with target cell 506. Also, target cell 506 may reject the RRC Resume request by sending RRC resume response with a rejection message to UE 502. When UE 502 is rejected by target cell 506, UE 502 may remove target cell 506 from the suitable cell(s) and find another cell for RRC Resume request.

For inter-RAT packet reception, after receiving the RRC suspend message, UE 502 may start packet reception if UE 502 receives paging message from the next generation radio access network (e.g., 5G-RAN). Then, UE 502 may also start the radio access procedure and the following RRC resume procedure.

Figure 9:
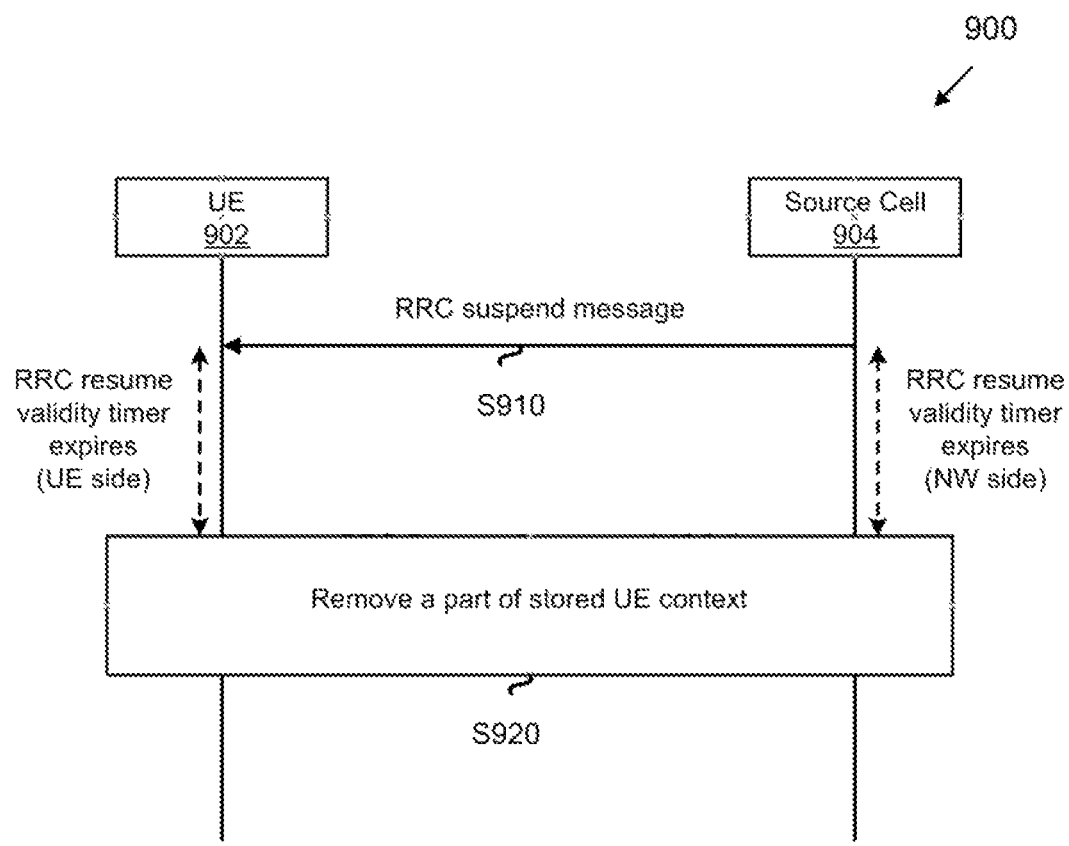
FIG. 9 is a diagram illustrating a validity period for UE context storage at UE and source cell for inter-RAT/intra-RAT RRC resume procedure, according to an exemplary implementation of the present application.

In some embodiments, an RRC resume validity timer is applied to invalidate (part of) the information in UE context and/or RRC suspend message. FIG. 9 is a diagram illustrating a validity period for UE context storage at UE and source cell for inter-RAT/intra-RAT RRC resume procedure, according to an exemplary implementation of the present application. The wireless communication system 900 includes UE 902 and source cell 904.

For example, the RRC resume validity timer may be utilized to invalidate UE context at both the UE side and the network (NW) side. In step S910, source cell 904 may provide the RRC resume validity timer (UE side) value in the RRC suspend message to UE 902. After the RRC suspend message is sent to UE 902, source cell 904 may activate or start the RRC resume validity timer on NW side. Meanwhile, UE 902 may activate or start the RRC resume validity timer on UE side after the RRC suspend message is received from source cell 904.

Source cell 904 may maintain the UE context of UE 902 before the expiration of the RRC resume validity timer (NW side). UE 902 may find a target cell and require for inter-RAT/intra-RAT RRC Resume before the expiration of the RRC resume validity timer (UE side). However, it is also possible that the UE may not find out the target cell before the RRC resume validity timer expires. In this condition, in step S920, UE 902 would remove or clear the stored UE context after the expiration of the RRC resume validity timer on the UE side. In addition, source cell 904 would remove the UE context of UE 902 after the expiration of the RRC resume validity timer on NW side. Therefore, after the expiration of the RRC resume validity timer, UE 902 may connect with RAN by requiring an RRC connection establishment rather than RRC resume request.

In another implementation, the RRC resume validity timer may be utilized to invalidate part of UE context/RRC suspend message. For example, the suggested CE level and target cell information in the RRC suspend message may become invalid after the RRC resume validity timer expires in both UE side and NW side. In such condition, UE 902 may still apply RRC resume procedure with the remaining valid information in the UE context and RRC suspend message. Source cell 904 may indicate clearly which part in the UE context and RRC suspend message is to become invalid after the RRC resume validity timer expires on both the UE side and the NW side. Source cell 904 may still store the valid UE context and control information configured in the RRC suspend message after the RRC resume validity timer expires.

As described above, several RRC connection resume methods are provided. According to the RRC connection resume method, when the UE determines that the radio link quality between itself and the serving source cell is getting poor and/or satisfies a predefined condition, the UE may receive the RRC suspend message from the source cell, and then perform the RRC resume procedure with the target cell in response to the RRC suspend message.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A radio resource control (RRC) connection resume method of a wireless communication system, comprising:
receiving, by a user equipment (UE), an RRC suspend message from a first base station;
performing, by the UE, an RRC resume procedure with a second base station in response to the RRC suspend message; and
receiving, by the UE, an RRC resume response from the second base station,
wherein the RRC suspend message comprises:
a) target cell information, and
b) target radio access technology information comprising numerology information.

2. The RRC connection resume method of claim 1, further comprising:
transmitting, by the second base station, a UE context fetch request to the first base station in response to the RRC resume procedure; and
receiving, by the second base station, a UE context fetch response from the first base station in response to the UE context fetch request;
wherein the first base station and the second base station is realized by different radio access numerologies, one of the first base station and the second base station is a wide-band numerology and another one is a narrow-band-Internet-of-Things numerology.

3. The RRC connection resume method of claim 1, further comprising:
transmitting, by the second base station, a UE context fetch request to the first base station in response to the RRC resume procedure; and
receiving, by the second base station, a UE context fetch response from the first base station in response to the UE context fetch request;
wherein the first base station and the second base station is realized by different radio access technologies, and one of the first base station and the second base station is a narrow-band-Internet-of-Things numerology.

4. The RRC connection resume method of claim 1, wherein the step of performing the RRC resume procedure with the second base station comprises:
transmitting, by the UE, an RRC resume request to the second base station;
wherein the RRC resume request comprises at least one of:
a) an RRC resume request cause; and
b) source cell information.

5. The RRC connection resume method of claim 1, wherein the RRC resume response comprises at least one of:
a) a data packet acknowledgement (ACK) or Non-acknowledgement (NACK); and
b) an area update response.

6. The RRC connection resume method of claim 1, further comprising:
transmitting, by the UE, an area update request to the second base station;
performing, by the second base station, an area update procedure with other network entities when the area update request is received;
receiving, by the UE, an area update response from the second base station.

7. The RRC connection resume method of claim 1, wherein the RRC suspend message further comprises an RRC resume validity timer, and the RRC connection resume method further comprises:
starting, by the UE, the RRC resume validity timer when the RRC resume validity timer in the RRC suspend message is received; and
removing, by the UE, at least a part of UE context when the RRC resume validity timer expires.

8. A user equipment (UE), comprising:
a processor configured to:
receive an RRC suspend message from a first base station;
perform an RRC resume procedure with a second base station in response to the RRC suspend message; and
receive an RRC resume response from the second base station,
wherein the RRC suspend message comprises:
a) target cell information, and
b) target radio access technology information comprising numerology information.

9. The UE of claim 8, wherein the processor is further configured to transmit an RRC resume request to the second base station, and the RRC resume request comprises at least one of:
a) an RRC resume request cause; and
b) source cell information.

10. The UE of claim 8, wherein the RRC resume response comprises at least one of:
a) a data packet acknowledgement (ACK) or Non-acknowledgement (NACK); and
b) an area update response.

11. The UE of claim 8, wherein the processor is further configured to:
transmit an area update request to the second base station; and
receive an area update response from the second base station.

12. The UE of claim 8, wherein the RRC suspend message further comprises an RRC resume validity timer, and the processor is further configured to:
start the RRC resume validity timer when the RRC resume validity timer in the RRC suspend message is received; and
remove at least a part of UE context when the RRC resume validity timer expires.

13. A base station, comprising:
a processor configured to:
transmit an RRC suspend message to a user equipment (UE);
receive a UE context fetch request from a second base station; and
transmit a UE context fetch response to the second base station in response to the UE context fetch request,
wherein the RRC suspend message comprises:
a) target cell information, and
b) target radio access technology information comprising numerology information.

14. The base station of claim 13, wherein the base station and the second base station is realized by different radio access numerologies, one of the base station and the second base station is a wide-band numerology and another one is a narrow-band-Internet-of-Things numerology.

15. The base station of claim 13, wherein the base station and the second base station is realized by different radio access technologies, and one of the base station and the second base station is a narrow-band-Internet-of-Things numerology.

16. The base station of claim 13, wherein the processor is further configured to:
receive an area update request from the second base station; and
transmit an area update response to the second base station in response to the area update request.

17. The base station of claim 13, wherein the RRC suspend message further comprises an RRC resume validity timer, and the processor is further configured to:
start the RRC resume validity timer when the RRC resume validity timer in the RRC suspend message is transmitted; and
remove at least a part of UE context when the RRC resume validity timer expires.

* * * * *